July 18, 1939.  N. P. RUPPENTHAL  2,166,447
BELT CONVEYER
Filed Dec. 27, 1937  2 Sheets-Sheet 1
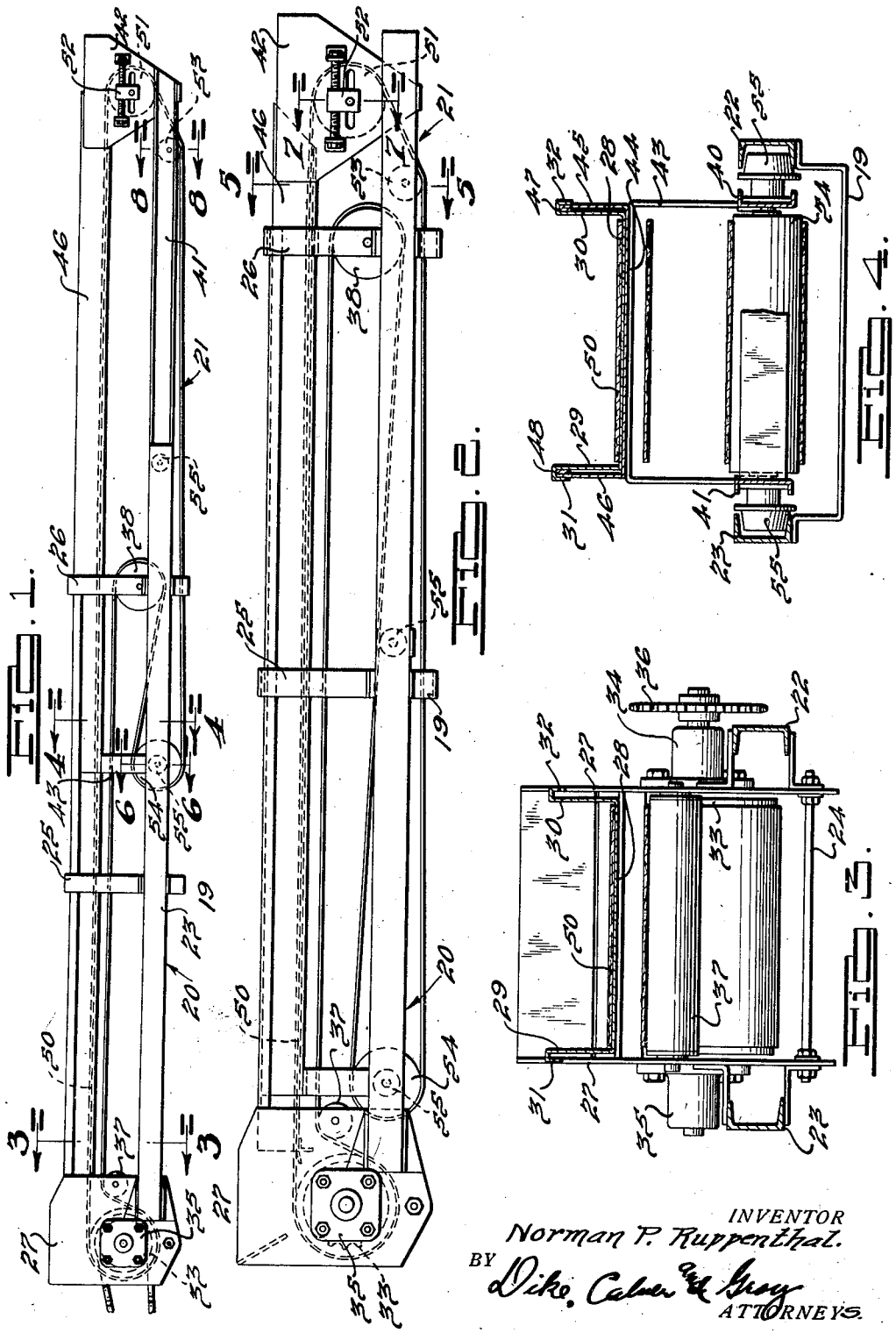
INVENTOR
Norman P. Ruppenthal.
BY
ATTORNEYS.

July 18, 1939.   N. P. RUPPENTHAL   2,166,447
BELT CONVEYER
Filed Dec. 27, 1937   2 Sheets-Sheet 2
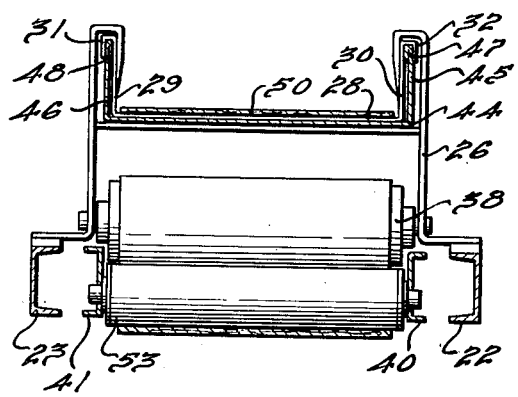
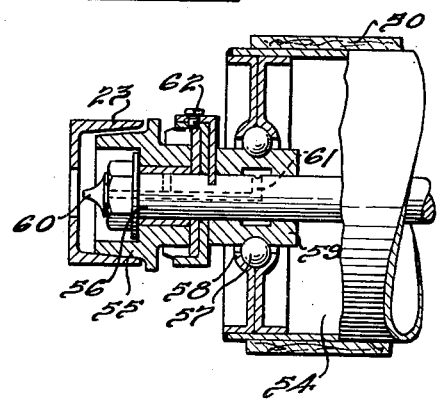
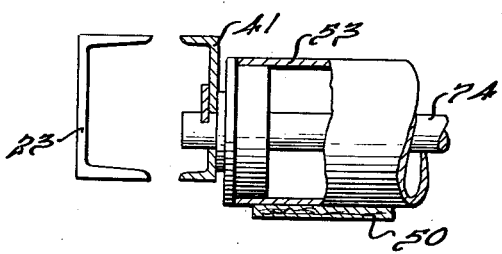
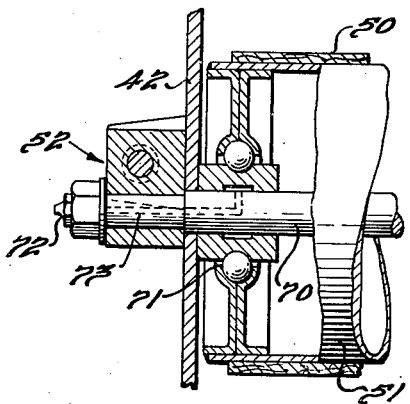
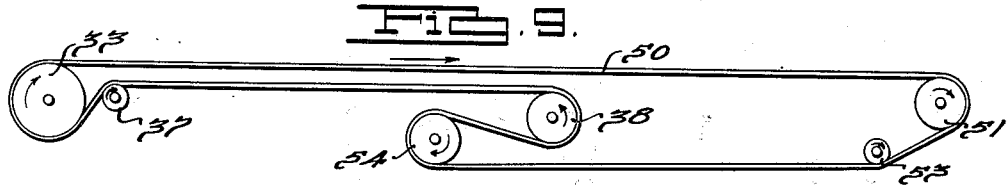
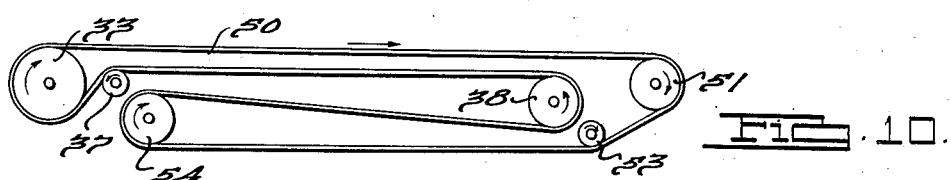
INVENTOR
Norman P. Ruppenthal.
BY Dike, Calver & Gray
ATTORNEYS.

Patented July 18, 1939

2,166,447

UNITED STATES PATENT OFFICE 2,166,447

BELT CONVEYER

Norman P. Ruppenthal, Detroit, Mich., assignor to General Conveyors Corporation, a corporation of Michigan Application December 27, 1937, Serial No. 181,735

3 Claims. (Cl. 198—139)

The present invention relates to belt type conveyers and is particularly adapted for use in endless belt conveyer constructions wherein adjustable conveyer lengths are desired. By way of example, but not of limitation, one field in which the present invention possesses novelty and great utility is in connection with vehicles used to transport bulk commodities such, for example, as coal, grain, and other materials. In such use a conveyer embodying the present invention may be connected as an attachment to the vehicle. The invention also possesses novelty and great utility in the handling of bulk or packaged commodities, as for example in storage buildings, warehouses, packing and sorting house, and the like or similar structures.

Belt conveyers embodying the present invention may also be used in connection with either fixed or portable conveyer installations in which adjustable lengths of the conveyer belt may be required.

It is a principal object of the present invention to provide an endless belt conveyer which may be readily adjusted to various lengths without changing the belt.

A further object of the present invention is to provide an endless belt conveyer which is particularly but not exclusively adapted for use in the construction of portable conveyers.

Another object of the present invention is to provide a telescoping endless belt conveyer in which the belt is maintained in driven relation to the driving pulley at all times during extension or retraction of the conveyer.

Other objects of this invention will appear in the following description and appended claims, reference being had to the accompanying drawings forming a part of this specification wherein like reference characters designate corresponding parts in the several views.

Fig. 1 is a side elevation of a conveyer embodying the present invention shown in a partially extended condition.

Fig. 2 is a side elevation in somewhat larger scale than Fig. 1 showing in the retracted position a conveyer embodying the present invention.

Fig. 3 is a section taken substantially on the line 3—3 of Fig. 1 in the direction of the arrows.

Fig. 4 is a section taken substantially on the line 4—4 of Fig. 1 in the direction of the arrows.

Fig. 5 is a section taken substantially on the line 5—5 of Fig. 2 in the direction of the arrows.

Fig. 6 is a fragmentary section taken substantially on the line 6—6 of Fig. 1 in the direction of the arrows.

Fig. 7 is a fragmentary section taken substantially on the line 7—7 of Fig. 2 in the direction of the arrows.

Fig. 8 is a fragmentary section taken substantially on the line 8—8 of Fig. 1 in the direction of the arrows.

Figs. 9 and 10 are diagrammatic views illustrating the arrangement of the belt and pulleys of the conveyer in the extended and retracted positions respectively.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A conveyer of the present invention comprises by way of example but not of limitation a supporting section indicated generally at 20 and a telescoping section indicated generally at 21. The supporting section 20 is arranged for mounting on the conveyer supporting member (not shown), which may be any suitable type of member for the purpose, for example, a supporting bracket attached to a suitable portion of a vehicle or to a wheeled truck if the conveyer is of the portable type.

As shown in Fig. 3, the supporting member 20 comprises spaced parallel rails 22 and 23 which form the track on which the telescoping section 21 is movable. The rails 22 and 23 are maintained in predetermined spaced position by cross braces, such for example as the braces 24 and 19 (Fig. 4). Bracket members 25 and 26 and plates 27 are connected with the rails 22 and 23 and extend upwardly above the rails to support the conveyer table section 28 which is formed with upwardly extending parallel side flanges 29 and 30 which are formed to provide channel sections 31 and 32 extending lengthwise thereof. The main belt driving pulley 33 is journaled in bearing flanges 34 and 35 secured to the plates 27 and is provided with a sprocket or other suitable connection 36 with a source of power for driving the pulley 33. In addition to the driving pulley 33, an idler pulley 37 and an end pulley 38 are mounted on the supporting section 20.

The telescoping section 21 comprises parallel spaced side rails 40 and 41, to which are connected upwardly extending plates 42 and a bracket 43 which are secured to and support the conveyer table section 44 (Fig. 4) which is formed with vertical upwardly extending side portions 45 and 46 which terminate in formed edges 47 and 48 which extend into the channels 32 and 31 of the supporting member 20. As shown in Fig. 4, the conveyer table section 44 underlies the bottom surface of the conveyer table section 28 and both underlie the lower surface of the conveyer section of the belt 50.

The telescoping section 21 is provided with an adjustable end pulley 51 mounted to provide a controlled lateral movement relative to the plate 42 upon adjustment of the belt tightening mechanism 52. An idler pulley 53 and an end pulley 54 also form a part of the telescoping section 21. The telescoping section 21 is provided with a plurality of roller members 55, which, as shown in Fig. 4, extend into the rails 22 and 23 to facilitate and guide the movement of the telescoping section 21 relative to the fixed section 20.

Further details of this construction are shown in Fig. 6 by way of example. In this instance, the roller member 55 is journaled on a shaft 56 on which the pulley 54 is rotatively mounted in any suitable manner, as for example by means of the ball bearings 57 and the bearing race 58 on the pulley and the bearing race 59 carried by the shaft 56. Lubrication of the roller 55 and the pulley bearings is effected through a suitable pressure lubrication fitting 60 carried mounted on the end of the shaft, and communicating lubricant passages 61 extending through the shaft from the fitting to the point where lubrication is desired. Adjustment of the rollers 55 relative to the rails 22 and 23 is accomplished by the adjustment mechanism indicated generally at 62.

The relative positions of the above described parts are shown in Fig. 1 and Fig. 4 when the telescoping section 21 is extended, and in Fig. 2 and Fig. 5 when the telescoping section 21 is retracted.

In Figs. 7 and 8 are shown details of mounting certain of the pulleys on the frame members. These may be of any desired conventional type of mounting known to those skilled in the art. As shown in Fig. 7, the end pulley 51 is journaled on a cross shaft 70 by suitable bearings 71. The cross shaft 70 and pulley 51 are movable as a unit longitudinally of the plate 42 on the telescoping member 21. Lubrication of the bearing is effected preferably through a pressure fitting 72 and a lubricant passage 73 which communicates with the fitting 72 and discharges adjacent the bearing 71.

The detailed mounting of the idler pulley 53 is shown in Fig. 8. This may be of any desired type, such for example as a journal bearing on the cross shaft 74.

The foregoing description is illustrative only of a preferred embodiment of the invention. It will be apparent to those skilled in the art that various changes can be made in the particular described structures without departing from the spirit of the present invention. I do not desire, therefore, to be limited to the details of the particular structures here disclosed.

The operation of a device embodying the present invention is as follows: The telescoping section 21 is mounted in the supporting section 20 and may be moved bodily longitudinally thereof. The effective length of the conveyer section of the belt 50 is changed automatically upon extension or retraction of the telescoping section and is at all times coextensive with the combined length of the conveyer table 28 carried on the supporting section 20 and the extended portion of the conveyer table 44 carried on the telescoping section 21. The automatic adjustment of the belt 50 is accomplished by the particular arrangement of the pulleys on the two sections and the threading of the belt thereon. This is most clearly shown by the diagrammatic views in Figs. 9 and 10. In Fig. 9 is shown the arrangement and positioning of the belt and pulleys when the conveyer is extended. The conveyer section in both views is substantially coextensive with the distance between the centers of the driving pulley 33 and the end pulley 51. As previously explained, the driving pulley 33 is mounted on the supporting section 20 and the end pulley 51 is mounted on the telescoping section 21. The pulley 38 is mounted on the supporting section 20 and is fixed relative to the drive pulley 33. The pulley 54 is mounted on the telescoping section 21 and is fixed relative to the end pulley 51. Upon movement of the telescoping section 21, it will be seen that the distances between the centers of the pulleys 51 and 54 relative to the pulleys 33 and 38 will be changed. The belt 50 as shown is threaded over the pulleys and forms a conveyer section between the pulley 33 and the pulley 51. The return path of the belt 50 forms a loop section which extends around the pulleys 54 and 38. As the pulleys 38 and 54 are moved nearer each other, as shown in Fig. 9, the looped section of the belt 50 is shortened and the surplus part of the belt is fed into the conveyer section. When the conveyer section is shortened, as shown in Fig. 10, the pulleys 38 and 54 are moved farther apart and the looped section of the belt is elongated. This takes up the surplus portion of the belt which results from shortening of the conveyer section. The idler pulleys 37 and 53 serve to define further the path of travel of the belt and are movable with the parts to which they they are attached.

It is to be noted that the conveyer belt 50 is in operative position at all times during the extension or retraction of the conveyer table sections so that an operable endless belt is provided at all times during extension or retraction of the conveyer. The conveyer section can be adjustably extended or retracted as described and the conveyer section of the belt at all times conforms thereto within the limits of the fully extended or fully retracted positions of the conveyer.

The extension and retraction of the parts of the conveyer may be effected and controlled in any desired manner, as for example by a rack and pinion gear actuated by a crank or by hydraulic actuating mechanism. Suitable means may also be provided for locking the parts at any desired point in the extension or retraction of the parts.

The ready adjustment of the length of the conveyer section as above described is particularly desirable in connection with conveyers for use with vehicles handling bulk commodities, as for example coal trucks, where the distance from the vehicle to a point of discharge or loading is frequently changed. It also is desirable in connection with storage, and loading and unloading of merchandise where the point of discharge of the merchandise from the conveyer varies as the operation proceeds.

I claim:

1. In an endless belt conveyer, an extensible and retractable conveyer platform, a power driven conveyer belt movable over said platform, means operable upon extension of said platform to elongate the effective conveying length of said belt and upon retraction of said platform to shorten the effective conveying length of said belt, said extensible and retractable conveyer platform comprising telescopically arranged supporting and extensible sections, said supporting section having a guide rail extending longitudinally and horizontally along each lower side edge and a guide channel extending longitudinally and horizontally along each upper side edge, and said extensible member having a plurality of rollers positioned to ride in said guide rails and a pair of longitudinally extending flanges slidably fitted in said guide channels.

2. In an endless belt conveyer, an extensible and retractable conveyer platform, a power driven conveyer belt movable over said platform, means operable upon extension of said platform to elongate the effective conveying length of said belt and upon retraction of said platform to shorten the effective conveying length of said belt, said extensible and retractable conveyer platform comprising telescopically arranged supporting and extensible sections, said supporting section having an inwardly facing guide rail extending longitudinally and horizontally along each lower side edge and a downwardly facing guide channel extending longitudinally and horizontally along each upper side edge, and said extensible member having a series of sidewardly extending rollers along each lower side edge positioned to ride in said guide rails and a pair of longitudinally extending vertical flanges slidingly fitted in said guide channels.

3. In an endless belt conveyer, an extensible and retractable conveyer platform, a power driven conveyer belt movable over said platform, means operable upon extension of said platform to elongate the effective conveying length of said belt and upon retraction of said platform to shorten the effective conveying length of said belt, said extensible and retractable conveyer platform comprising telescopically arranged supporting and extensible sections, said supporting section having a guide rail extending longitudinally and horizontally along each lower side edge and a guide channel extending longitudinally and horizontally along each upper side edge, and said extensible member having a plurality of rollers positioned to ride in said guide rails and a pair of longitudinally extending flanges slidably fitted in said guide channels, said lower guide rails extending outwardly substantially beyond the outer ends of said guide channels to strengthen said conveyer platform when said extensible section is in its extended position.

NORMAN P. RUPPENTHAL.